July 20, 1965  A. R. KNOOP  3,196,254
HEATER CONTROL SYSTEMS
Filed Feb. 21, 1961  5 Sheets-Sheet 1

FIG.1.

POWER SUPPLY CIRCUITS

FIG.7.

HEATER CIRCUITS

INVENTOR
ALAN R. KNOOP
BY
ATTORNEY

FIG.8.

3,196,254
HEATER CONTROL SYSTEMS
Alan R. Knoop, Richmond, Va., assignor to Allied Chemical Corporation, New York, N.Y., a corporation of New York
Filed Feb. 21, 1961, Ser. No. 90,663
9 Claims. (Cl. 219—486)

This invention relates to electrical control systems for regulating supply of electrical energy to multiple locations of utilization. The invention is directed more particularly to improvements in push-button selection of one of a plurality of points of utilization, for example electric heaters, and for controlling supply of electrical energy to a selected point of use in accordance with predetermined temperature requirements.

The invention, and the objects and advantages thereof may be understood from the following description taken in connection with the accompanying diagrammatic drawings in which—

Figure 1:
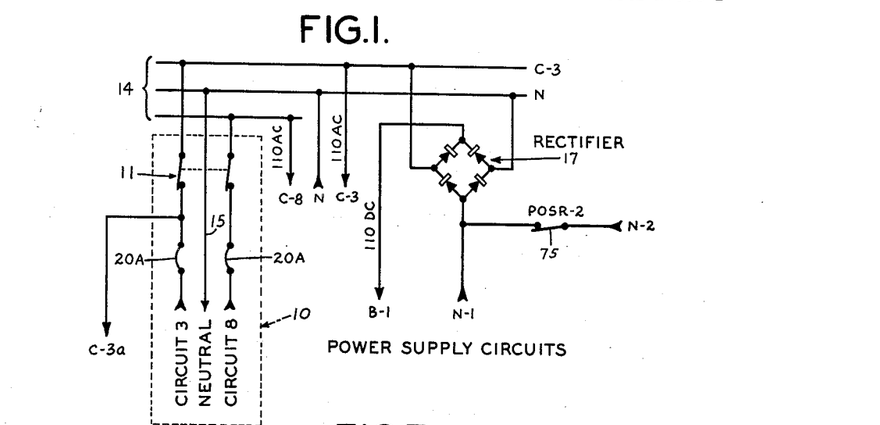
FIG. 1 indicates primary electrical supply circuits.

The primary power supply circuits of FIG. 1 comprise a panel 10 to which is fed a 3 wire single phase circuit from an outside source. The panel, which includes fuses and a main switch 11, supplied to a 3 wire bus bar 14, positive 110 volt circuits 3 and 8 each associated with a negative line 15. A.C. current is furnished to the system of the invention off the bus bar by circuits indicated as C-8, N, and C-3. A full-wave bridge rectifier 17 is connected in on C-3 and N of the A.C. bus bar, and feeds 110 volt D.C. to circuits designated as B-1 and N-1, and N-2. The purposes of the power off switch at POSR-2 will appear.

Figures 5, 6:
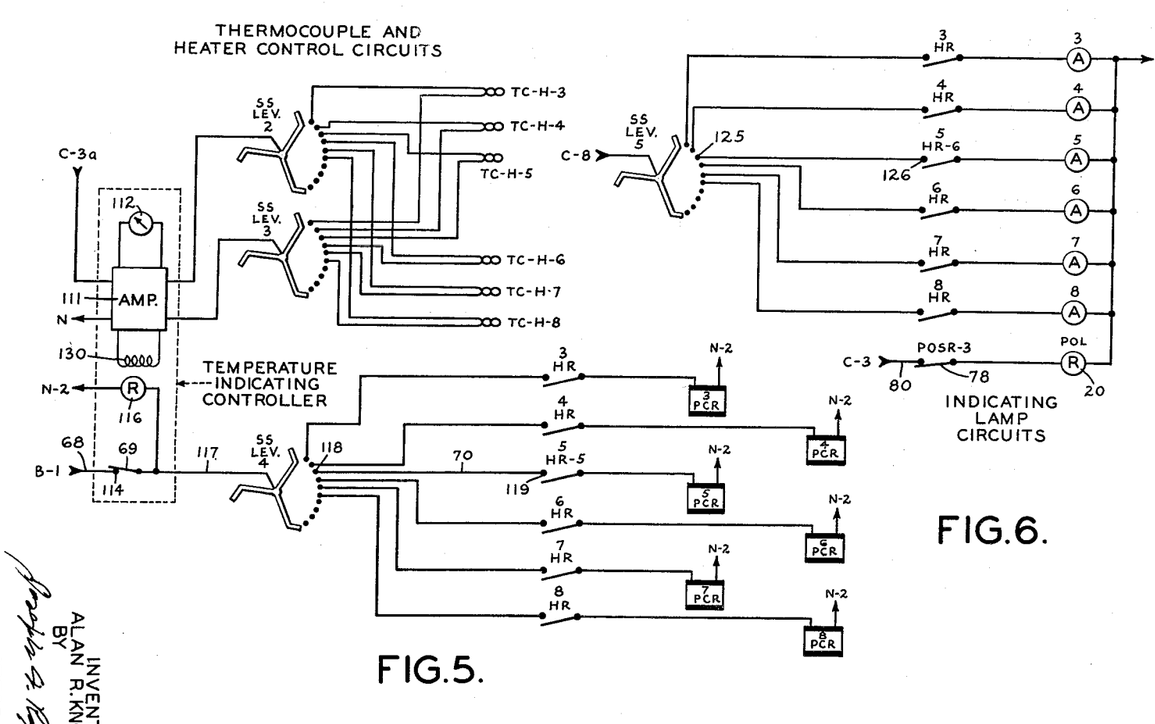
FIG. 5 diagrams thermocouple selection and heater current relay control circuits.
FIG. 6 shows indicating lamp circuits.
Figure 7:
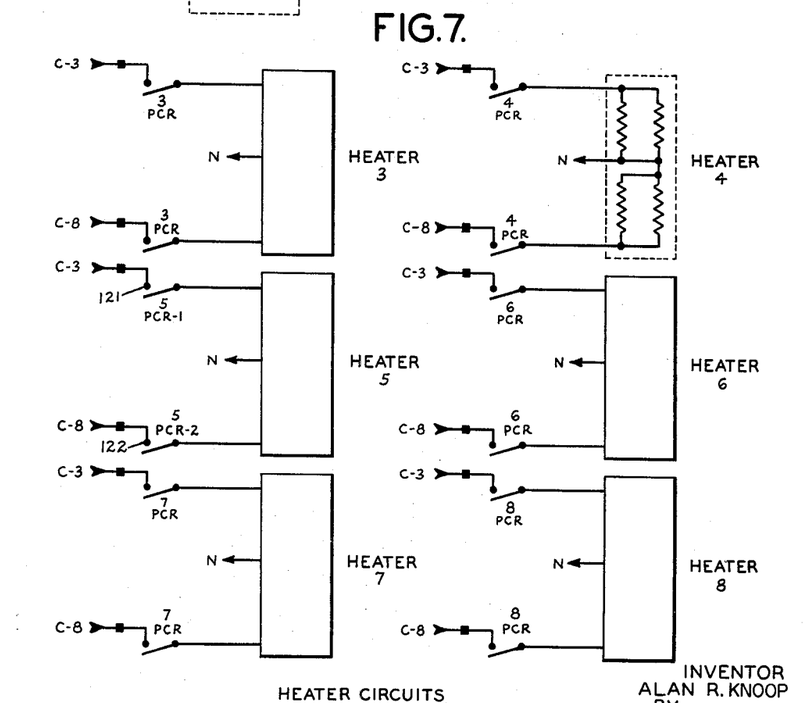
FIG. 7 illustrates a group of unitary heaters each of which may be associated with industrial equipment not shown.

By means of principal distribution wiring, not shown for purposes of simplification, C-3 of FIG. 1 feeds 110 volt A.C. to the positive side of one of the heating coils in each of heaters 3-8 of FIG. 7, and supplies the same positive energy to red power off light POL of FIG. 6. The negative sides of the heater coils mentioned, and the negative side of power off light 20 are tapped into the common neutral line feeding into circuit N of FIG. 1. A conductor running from C-8, FIG. 1, supplies 110 volt A.C. to the positive side of each of the second heating coils shown in each of the heaters 3-8. The same C-8 conductor feeds positive 110 volt A.C. to the positive side of power off stick relay POSR-1 of FIG. 3, i.e. via line 71 to off-normal contact #2 of the stepping switch, and via line 73 to stick relay contact spring 72 of FIG. 3, and also feeds 110 volt A.C. to step switch level 5 (FIG. 6) which furnishes positive A.C. to the lamp signal circuits of FIG. 6. The negative sides of each of the second coils of each of heaters 3-8 of FIG. 7, the negative side of POSR-1 of FIG. 3, and the negative sides of amber signal lights 3-8 of FIG. 6 are all tapped into a common neutral cable feeding into circuit N of FIG. 1. Connections to the foregoing distributing conductors from C-8, N, and C-3 of FIG. 1 to and from the various units or groups of units mentioned are designated on the drawings diagrammatically and by corresponding legends and current flow directional arrowheads.

Circuits B-1 and N-1 of FIG. 1 charge uninterrupted 110 volt D.C. to certain units of the invention system by means of a common distribution circuit, wiring not shown, beginning at B-1, FIG. 1 and terminating at N-1. A first tap-off 25, FIG. 3, from B-1 of FIG. 1 supplies 110 volt D.C. to a step switch contact spring 27 which rides in contact with a step switch cam 28 shown in FIG. 3 in the normal or "home" position. Contact spring 27 is also associated with an off-normal bridge 31, FIGS. 3 and 2, carrying fixed contacts 34 and 35. When cam 28 and spring 27 are in the off-normal position, circuit B-1 passes thru contact 34, off-normal bridge 31, and contact 35, and feeds B-1 into contact spring 37 of FIG. 2, and thru the successive switch springs to the left (when positioned as in FIG. 2) to the positive side of step switch magnet 40. The negative side of magnet 40 communicates thru contact spring 42 of the step switch interrupter to step switch level #1. Inspection of the step switch wiper 43 and its associated positioning contacts and outlet wiring, e.g. 45 and 46, shows that with the various contact springs, e.g. 5HR-4 in the position shown in FIG. 2, all outlets on the negative side of the #1 wiper and selector points tap into an N-1 circuit which leads back to N-1 of FIG. 1.

Figure 2:
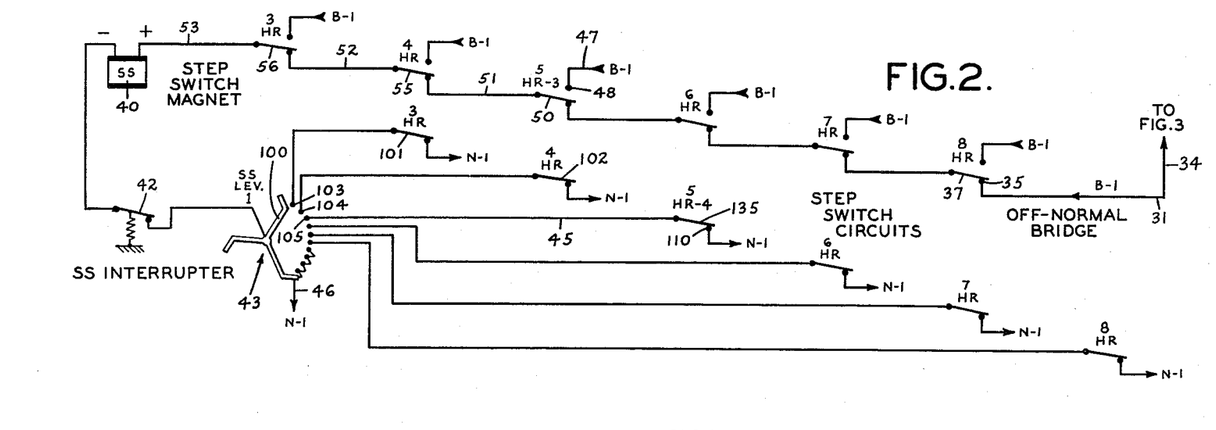
FIG. 2 represents coil control circuits of a multi-level step switch.

A second group of tap-offs from B-1 of FIG. 1 is typified at 47 of FIG. 2 where B-1 feeds to a front contact 48 which, when contact spring 50 of relay 5HR-3 is thrown into horizontal position by an operation hereafter described, supplies positive D.C. thru lines 51, 52 and 53, when contact springs 55 and 56 are in the position shown, to the positive side of step switch magnet 40. Thus, when uninterrupted B-1 positive D.C. enters the step switch circuits, e.g. via contact 48 and contact spring 50 when in the horizontal position, the step switch magnet 40 will be energized because it is connected up thru wiper 43 and associated positioning points with the N-1 line as previously indicated.

Figure 3:
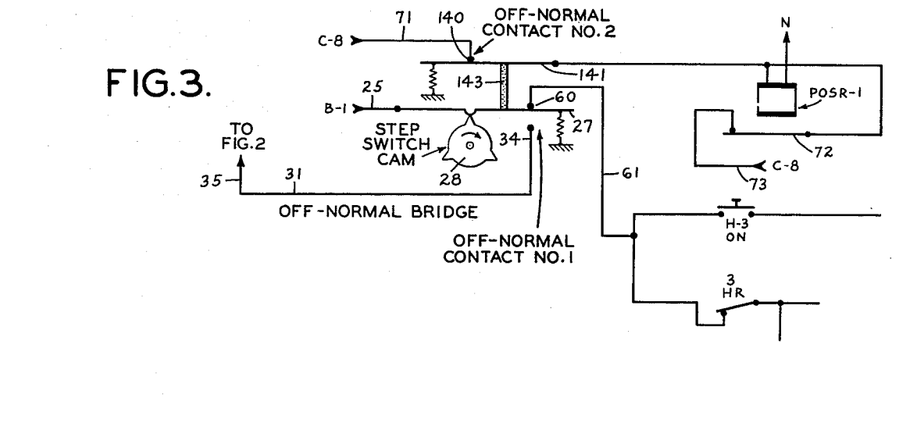
FIG. 3 illustrates auxiliary contacts associated with the step switch, the left end of FIG. 3 being a continuation of the right end of FIG. 2.
Figure 4:
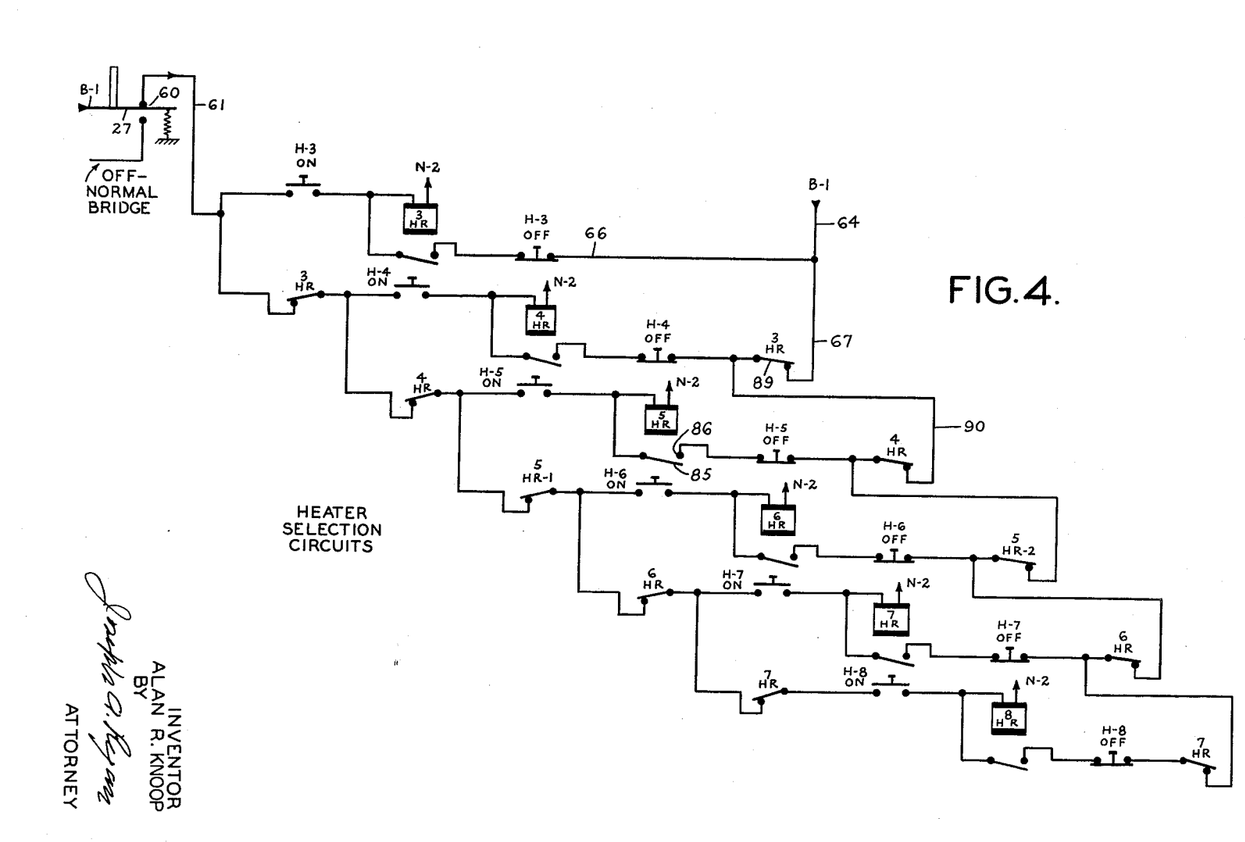
FIG. 4 denotes heater selection circuits, the left end of FIG. 4 being a continuation of a part of the right end of FIG. 3.
Figure 8:
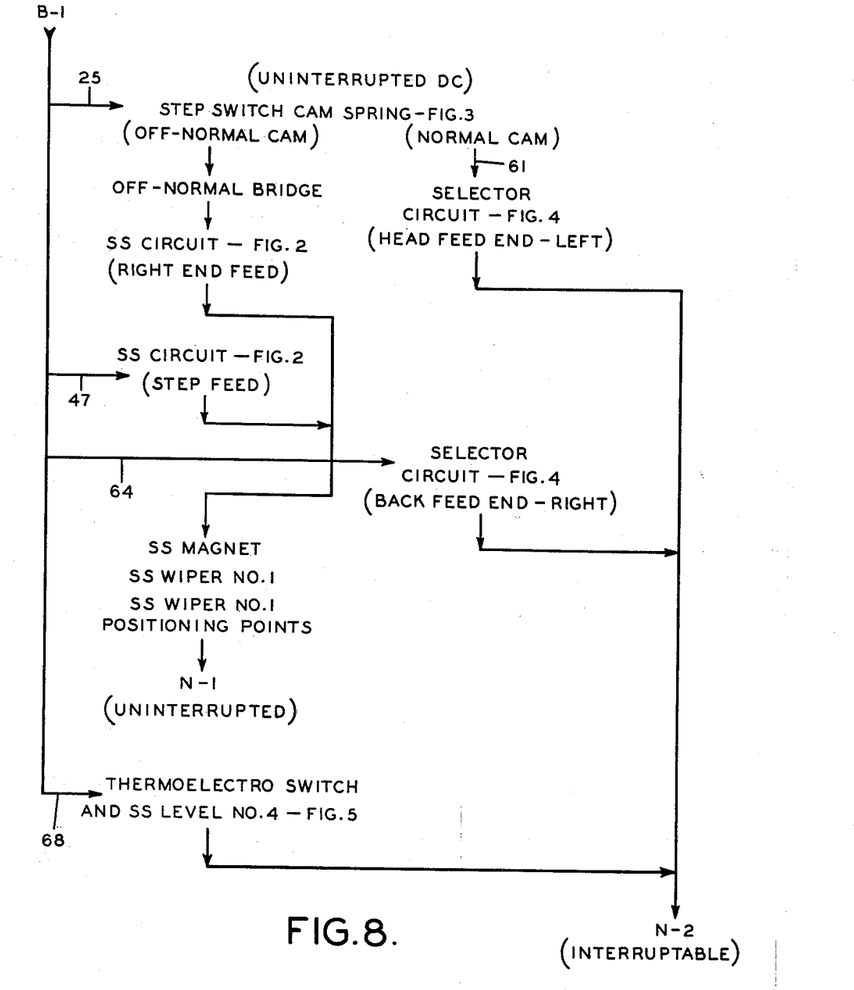
FIG. 8 represents current distribution of one circuit in the system.

When step switch contact spring 27 is in the normal or home position as shown in FIG. 3, positive D.C. current is tapped off B-1 at 25, passes thru spring 27, thru contact 60 and line 61 into the head-feed or pick-up (left) end of the heater selection circuits of FIG. 4. The latter circuits utilize B-1 current as back-feed or stick or lock-in power which is tapped off B-1 at 64 and is back fed into the heater selection circuits, as at 66 and 67 for hereinafter described relay locking purposes. The negative side of each of the relays of each of the heater selection circuits is tapped into a negative line connected with the interruptible N-2 circuit of FIG. 1. Uninterrupted positive D.C. is supplied from B-1 of FIG. 1 by tap-off 68 (FIG. 5), and when contact spring 69 is in the position shown, positive D.C. passes thru the wiper of step switch level 4 into one of 6 circuits each of which includes a switch associated with a selecting relay of FIG. 4 and includes a power control relay coil, for example a switch at 5HR-5 (associated with relay 5HR of FIG. 4) and power control relay 5PCR both in line 70. It will be noted that the negative side of each of the power control relays of the heater control circuits of FIG. 5 taps into a cable for conductance back to the interruptible N-2 circuit of FIG. 1. The foregoing descriptions of B-1 feed from FIG. 1 and back to the uninterrupted N-1 circuit or back to the interruptible N-2 circuit are illustrated schematically in FIG. 8.

The invention may be exemplified by application to an apparatus assembly including 6 separate and unitary heaters, e.g., heaters 3-8 of FIG. 7, in an industrial situation in which it is desired to operate only a single heater at a time, and overloading of the main source of energy must be avoided. The control system of the invention includes 6 interlocking heater selection circuits illustrated principally in FIG. 4, the legends on FIG. 4 and throughout the drawings being such as to relate various relays and other instrumentalities to a correspondingly designated specific heater. In the drawings, it is assumed that the A.C. and D.C. sources of energy are turned on and that the step switch is in the normal or home position with the result that all portions of the control system are in the positions indicated in the drawings. In this situation, A.C. positive current from C–8, entering thru line 71 FIG. 3, energizes the coils of power off switch relay POSR–1 closing contact spring 72 which thereafter remains in the locked-in position as long as C–8 feeds into line 73. Contact spring 72 is tied mechanically with contact spring 75 of POSR–2 of FIG. 1, and with contact spring 78 of POSR–3 of FIG. 6. Red power light 20 of FIG. 6 is on thus showing that both circuits C–3 and C–8 are functioning properly, this being so because if C–8 were not being charged as in FIG. 3, contact spring 78 FIG. 6 would be off contact 80 and light 20 would be out, whereas if C–8 were functioning but C–3 were out, power light 20 also would be out.

The following description of operation is on the assumption that the operator wishes to utilize heater 5 of FIG. 7. With the step switch and cam 28 thereof in the home position, as shown particularly in FIG. 3, B–1 feeds in thru contact spring 27, contact 60, and line 61 into the head-feed end of the heater selection circuits of FIG. 4. The operator presses the H–5 On button (H for heater, and 5 for the heater number), heater relay 5HR energizes, and contact spring 85 closes across contact 86. Circuit B–1 supplies tail-feed or relay locking feed thru line 67, contact spring 89, line 90, contact spring 92, and closed H–5 Off button to heater relay 5HR thus locking contact spring 85 over contact 86. Contact springs 5HR–1, 5HR–2 of FIG. 4, 5HR–3 and 5HR–4 of FIG. 2, 5HR–5 of FIG. 5, and 5HR–6 of FIG. 6 are mechanically coupled with contact spring 85 of relay 5HR. Thus, when 5HR is energized and while contact spring 85 is held locked-in by B–1 back-feed, the 6 other contact springs 5HR 1 to 6 are pulled into the horizontal position and away from the positions shown on the drawing. When the contact at 5HR–1 FIG. 4 is broken, head-feed of B–1 into selector circuits controlled by 6HR, 7HR and 8HR is cut out, and since the contact spring of 5HR–2 has broken B–1 back-feed into circuits controlled by 6HR, 7HR, and 8HR, circuits 6HR, 7HR and 8HR in their entirety are cut out from the rest of the selector system. Because the H–3 On and H–4 On buttons are open, no B–1 head-feed is supplied to heater relay 3HR or to 4HR, both of which relays remain inoperative notwithstanding back-feed from B–1 tap off 64 thru the closed H–3 and H–4 Off buttons. Hence, the circuits of 3HR and 4HR are cut out from the selector system.

Simultaneously with the closing of 5HR of FIG. 4, contact spring 50 of 5HR–3 of FIG. 2 closes with contact 48, and B–1 D.C. flows thru line 51, contact spring 55, line 52, contact spring 56 and line 53 to the positive side of step switch magnet 40. The 5 level step switch illustrated only diagrammatically is a known piece of equipment including a shaft carrying the 5 wipers denoted and the step switch cam 28 (FIG. 3), the wipers and the high points on the cam being axially aligned, with wiper arms and cam high points spaced circumferentially 135° apart. The step switch magnet includes a movable armature which is mechanically tied to interrupter spring 42 (FIG. 2), and which is mechanically associated with a detent and ratchet arrangement connected to the step switch shaft so that energization of the stepping magnet causes the wipers on each of the 5 levels to advance one step, and also to open the interrupter spring 42. Hence, when contact spring 50 first closes across contact 48, magnet 40 finds negative energy thru spring 42, step switch level #1 wiper, the selector points segment tap off 46 connecting into N–1, and magnet 40 energizes. Thru movement of the magnet armature and the detent and ratchet arrangement associated with the step switch shaft, level #1 wiper arm 100 advances to position point 103, and by the same magnet armature movement contact spring 42 is lifted off its contact relieving negative energy from the magnet, and the magnet releases. When wiper arm 100 is on selector point 103, negative energy is again supplied to the magnet thru contact spring 101 at which time the wiper arm 100 advances to the 104 position. The magnet again finds negative energy thru contact spring 102 and arm 100 advances to the 105 position point. Thereafter, since contact between 5HR–4 spring with contact 110 has been broken, wiper arm 100 remains in contact with selector point 105. The wiper arms of step switch levels 2, 3, 4 and 5 follow movement of the wiper of step switch level #1, and all five wipers have reached and remain in corresponding positions.

When the wipers of step switch levels 2–5 reach the positions indicated, further operation is as follows. Wiper levels #2 and #3 close thermocouple TC H–5, FIG. 5, thermally associated with heater 5, across amplifier 111 continuously kept in heated responsive condition by circuit C–3a which is tapped off the panel of FIG. 1 independently of all other elements except the fuses. Temperature generated in heater 5 is visually notable on dial indicator 112. Contact spring 69 of the temperature indicating controller is usually closed across contact 114 as shown in FIG. 5, and uninterrupted D.C. current from B–1 tap off 68 flows thru an indicating light 116, and also thru line 117 to the wiper of step switch level #4 which is on positioning point 118. As previously noted, contact spring 5HR–5 is closed across contact 119, and power control relay 5PCR is energized at which time contact springs 5PCR–1 and 5PCR–2 of FIG. 7 simultaneously close across contacts 121 and 122 respectively, thus supplying A.C. to both coils of heater 5 from C–3 and C–8. With the wiper of step switch level #5 on positioning point 125 FIG. 6, and contact spring 5HR–6 closed across contact 126 as previously described, amber indicating lamp 5 is energized indicating to the operator that heater 5 is in operation.

Amplifier 111 FIG. 5 includes a coil 130 the armature of which is mechanically associated with switch spring 69. By means of known equipment, coil 130 and its armature are adjusted to open contact spring 69 at a given predetermined temperature e.g. 125° C. If temperature in heater 5 exceeds the desired limit, contact between spring 69 and contact 114 is broken, temperature indicating controller light 116 goes out, no current passes thru step switch level #4 nor line 70, with the result that power control relay 5PCR releases with consequent opening of the contacts at 5PCR–1 and 5PCR–2 FIG. 7 to shut off A.C. to heater 5. During the time switch spring 69 FIG. 5 is off contact 114, with the exception of power control relay 5PCR and the contact springs at 5PCR–1 and 5PCR–2 FIG. 7, all other parts of the control system remain as were, and as has been described. On cooling of heater 5 to within the predetermined maximum, switch spring 69 FIG. 5 closes over contact 114, and thru energization of power control relay 5PCR supply of A.C. to heater 5 is resumed. The controller including temperature indicator 112, amplifier 111, indicating light 116, coil 130 and switch 69 may be included in a known available unit.

From consideration of FIG. 3 it will be observed that as the step switch wipers and cam 28 move off the normal or home position, contact spring 27 depresses, engages contact 34 and disengages with contact 60. It will be recalled that head-feed energy to the selection circuits was, at the outset, supplied thru spring 27, contact 60 and line 61. In accordance with the invention, such charging of D.C. as head-feed to the heater selection circuits is cut out immediately after cam 28 moves away from the home position, i.e. almost simultaneously with push down of e.g. the H–5 On button. Thus, the cutting off of D.C. head-feed to the heater selection circuits cuts out all head-feed with the result that the operation of any On or Off button in the heater selection circuits, except H–5 Off button, produces no effect whatsoever. Total cutting off of head-feed insures that, during a cycle of supplying energy to a given heater, no other selection circuit can be brought into operation, for example by the accidental pushing down of the On button of any selection circuit other than the one in use. Moreover, the foregoing arrangement, involving opening contact 60 FIG. 3 during all the time the step switch cam 28 is off normal, is such that the operator cannot cause the step switch to move away from its selected position by operating any button other than the H–5 Off button FIG. 4, this condition existing because none of the heater relays of any of the selection circuits can be energized when the step switch cam 28 is off normal.

When desired to terminate supply of energy to heater 5, the operator depresses the H–5 Off button releasing relay 5HR, and at the same time contact springs 5HR–1 and 5HR–2 FIG. 4, 5HR–3 and 5HR–4 FIG. 2, 5HR–5 FIG. 5 and 5HR–6 FIG. 6 are similarly released and returned to the position shown in the respective drawing figures. Since contacts at 5HR–5 FIG. 5 and at 5HR–6 FIG. 6 are broken, both coils of heater 5 are cut off by corresponding opening of the contact springs at 5PCR–1 and 5PCR–2 FIG. 7, and the amber light 5 FIG. 6 goes out.

At the time of push down of H–5 Off button FIG. 4 wiper arm 100 of step switch level #1 FIG. 2 is in contact with positioning point 105. Since step switch cam 28 FIG. 3 is off normal, contact spring 27 is closed over contact 34, uninterrupted B–1 curent is charged into the off-normal bridge 31 FIG. 3, and, via contact 35, is fed into the remote (right) end of the circuit of FIG. 2 which supplies positive energy to step switch magnet 40. Hence, with wiper arm 100 of step switch level #1 in contact with positioning point 105 and since contact spring 135 of 5HR–4 is already closed over contact 110, it will be seen that immediately after push down of H–5 Off button, because of uninterrupted supply of positive D.C. to the magnet, the interrupter, step switch level #1, and all positioning points which connect with uninterrupted N–1, the magnet functions stepwise until a given wiper arm and the cam 28 (FIG. 3) return to the home position at which time contact between spring 27 and contact 34 is broken, thus shutting off supply of positive D.C. to the step switch magnet. At this stage, all relays and other instrumentalities are returned to the positions as shown in the drawings, and the system is ready for use on any other selected heater.

The control system of the invention is such as to provide for all exigencies likely to be encountered in industrial operations. Assuming the system is as illustrated in the drawings, i.e. ready for the selection of a cycle, simultaneous push down of two On buttons does nothing but throw into cycle the circuits controlled by the lowest numbered heater relay of FIG. 4. For example, assuming that the H–5 On button and the H–6 On button were pressed down simultaneously, the 5HR relay will energize as before described, and the 6HR relay 138 will momentarily energize. However, immediately on closing of contact spring 85 over contact 86 by energization of 5HR, contact springs at 5HR–1 and 5HR–2, because of mechanical connection with contact spring 85, are immediately pulled away from their contacts thus cutting off both head-feed and tail-feed of energy to 6HR. If use of heater 5 was not desired and it was intended to throw in heater 6, it is only necessary to press down the H–5 Off button, permit the step switch and cam to step around to home, and thereafter press the 6HR On button. Operation of another On button when the system is in cycle effects no result since there is no head-feed input to the heater selection circuits because there is no contact between spring 27 and contact 60 FIG. 3.

Assuming that C–3 power goes off for some reason or other when the system is out of cycle with step switch cam 28 in the home position, nothing happens except red power off light 20 goes out and no energy is fed to amplifier 111. Since C–8 power is still on, C–8 is feeding into POSR–1 FIG. 3 thru line 73, and POSR–1, POSR–2 FIG. 1, and POSR–3 FIG. 6 remain closed but ineffective. When C–3 is restored, the system is ready for start of another heating cycle. If the system is in cycle, e.g. on heater 5, and C–3 power goes off, 5HR FIG. 4 releases because there is no B–1 tail-feed entering the heater selection circuits via tap off 64. All 5HR springs 1 to 6 release, and since 5PCR FIG. 5 releases, because of 5HR–5 release, all power to heater 5 is cut off. All B–1 and all N–1 energy from rectifier 17 is off, the step switch circuits FIG. 2 are off, and the wiper of step switch level #1 remains on the previously selected position. POSR–1 FIG. 3, POSR–2 FIG. 1, and POSR–3 FIG. 6 hold in, because C–8 power is still on, but remain ineffective as before. Red power light 20 FIG. 6 is off. When C–3 power is restored, 5HR relay FIG. 4, 5PCR FIG. 5 and all of 5HR 1-6 contacts are out, thus preventing feed of C–3 and C–8 A.C. to heater 5. However, immediately on restoration of C–3, the step switch magnet, step switch level #1 wiper and associated wiring and relays are in circuit as shown in FIG. 2 and, since contact spring 27 FIG. 3 is in the off-normal position, B–1 D.C. is supplied to the step switch circuits FIG. 2 thru the off-normal bridge 31 FIG. 3, and the step switch wiper 43 goes back to the home position. Red power light 20 FIG. 6 is on, and the system is ready for start of another heating cycle.

Assuming that C–8 power goes off when the system is out of cycle and the step switch cam 28 is in the home position, power off switch relay POSR–1 FIG. 3 releases because no C–8 power is supplied from either line 71 or 73, and mechanically associated spring contacts 75 FIG. 1 and 78 FIG. 6 break. Amber indicating light 5 is off because C–8 is out, and red power off light 20 is out because the contact spring 78 of POSR–3 FIG. 6 has dropped away from contact 80 by reason of release of POSR–1 FIG. 3. The 5HR relay, all 5HR 1 to 6 contacts, and the power current relay 5PCR of FIG. 2 are in the released position, and hence no power (no C–3 power) is transmitted to heater 5. Step switch circuits of FIG. 2 are out because, cam 28 FIG. 3 being in home position, there is no connection between spring contact 27 and contact 34, i.e. the off-normal bridge 31 is dead. When C–8 power is restored, POSR–1 FIG. 2 is energized, contact spring 75 of POSR–2 FIG. 2 and spring 78 of POSR–3 FIG. 6 are closed, red power light 20 is on, and the system is ready for start of a heating cycle.

In the event of C–8 power failure when the system is on cycle, e.g. on heater 5, amber light 5 FIG. 6 goes out, POSR–1 FIG. 3 deenergizes and contact spring 72 of POSR–1, spring 75 of POSR–2 FIG. 1 and spring 78 of POSR–3 FIG. 3 break from respective contacts. The circuit of N–2 FIG. 1 is immediately broken by displacement of contact spring 75 with the result that the circuit thru 5HR FIG. 4 is broken in which situation relay 5HR, all 5HR–1–6 contact springs and 5PCR relay FIG. 5 return to positions shown on the drawings, and all power to heater 5 is shut off. However, since D.C. circuits B–1 and N–1 are still operative, and cam 28 of FIG. 3 is in the off-normal position and the off-normal bridge is energized by spring contact 27 and contact 34, the system of FIG. 2 is in circuit with uninterrupted B–1 and N–1, and accordingly the step switch steps around to home. When C–8 power is restored with the cam 28 in the home position, relay POSR–1 FIG. 3 is energized, interruptable circuit N–2 is closed at 75 FIG. 1, red power off light 20 FIG. 6 goes on, and the system is ready for start of another heating cycle. In accordance with the invention, the negative sides of all of the HR relays of FIG. 4 and of all of the PCR relays of FIG. 5 are tapped into the N–2 circuit which is interruptible in FIG. 1 by opening of spring contact 75. This expedient insures immediate release of all of the HR and PCR relays mentioned and also immediate shut-off of an operating heater in the event of in-cycle power failure in a main A.C. circuit (e.g. C–8) not used for rectification to the D.C. employed in the selection and step switch circuits. Furthermore, the invention provides for uninterrupted supply of D.C. from B–1 and N–1 FIG. 1 to the step switch circuits of FIG. 2. Hence, in the event of in-cycle power failure in a main A.C. circuit (e.g. C–8) not used for rectification to D.C., there is available an interrupted D.C. circuit to step the step switch back to home to await restoration of the failed A.C. circuit.

FIG. 3 shows another off-normal contact #2 between contact 140 and contact spring 141, the latter being held against contact 140 by an insulated block 143 which may be fixed at its lower end to contact spring 27 and engages the underside of spring 141. If, after a failure of C–8 power, the step switch is not stepped around to home for some reason or other, cam 28 remains in an off-normal position, contact between contact spring 141 and contact 140 is broken, and restoration of C–8 will not put the system into operative condition because off-normal contact #2 is broken and POSR–1 will not restore. Hence, the system cannot go back into operation, without adjustment of the step switch back to normal, followed by push down of an On button in the selector circuits.

If main switch 11 FIG. 1 were thrown out during a heating cycle, all HR relays and all PCR relays of FIGS. 4 and 5 are released to the positions shown in the drawings, and when main switch 11 is again thrown in nothing happens except the step switch steps around to home at which time the system is again ready for start of another heating cycle. The same situation exists should a heater short circuit, in which instance after fuse replacement nothing happens except the step switch steps back to home position.

I claim:

1. In apparatus inclining a plurality of separably operable A.C. energized heaters and a source of A.C. power, a system for controlling feed of A.C. power to and temperature of a predetermined heater which system comprises a like plurality of D.C. actuated selection circuits each associated with a corresponding heater and each containing a D.C. actuated selector relay, a like plurality of D.C. actuated power control circuits each associated with corresponding selection circuit and its corresponding heater and each containing a power control relay operable by energization of the corresponding selector relay, a D.C. actuated plural level step switch including in one level an off-cycle home position and a plurality of positioning contact points each associated with a corresponding selection circuit and its corresponding heater, means—operable on energization of the selector relay corresponding to the said predetermined heater and acting through a D.C. circuit electrically associated with the step switch and controlled by energization of such selector relay—for moving the step switch to a positioning contact point corresponding to such selector relay to effect energization of the corresponding power control relay and feed of A.C. power to the corresponding and predetermined heater, and means responsive to a predetermined maximum temperature in such predetermined heater to open the power control circuit corresponding to such predetermined heater and cut off feed of A.C. power thereto.

2. The system of claim 1 in which each selection circuit is adapted to be fed with initial relay energizing D.C. and with relay lock-in D.C., and which system includes means acting on movement of the step switch off home position to cut off feed of initial energizing D.C. to all relays in all selection circuits.

3. The system of claim 1 in which the circuit associated with the step switch is fed with uninterrupted D.C. and which system comprises means including such circuit and acting on de-energization of the selected selector relay to cut off feed of A.C. power to the predetermined heater and thereafter return the step switch back to home position.

4. In apparatus including a plurality of separably operable A.C. energy utilizers and a primary source of A.C. power consisting of first and second positive A.C. lines and a negative A.C. line, a secondary source of A.C. power derived from the primary source and consisting of two positive lines and one negative line and arranged to supply A.C. power to each of said utilizers, and a source of D.C. power derived from the negative and first positive lines of said primary source, a system for controlling feed of A.C. power to a predetermined utilizer which system comprises a like plurality of D.C. actuated selection circuits each associated with said D.C. source and with a corresponding utilizer and each containing a D.C. actuated selector relay, a like plurality of D.C. actuated power control circuits each associated with a corresponding selection circuit and its corresponding utilizer and each containing a power control relay and a switch operable by energization of the corresponding selector relay and connected to control flow of D.C. to such power control relay, a D.C. actuated plural level step switch including a home position and a plurality of positioning contact points each associated with a corresponding selection circuit and its corresponding utilizer and means—operable on energization of the selector relay corresponding to the said predetermined utilizer and acting through a D.C. circuit electrically associated with the step switch and controlled by energization of the selector relay—for moving the step switch to a positioning contact point corresponding to such selector relay to effect closing of the corresponding power control circuit switch and energization of the corresponding power control relay, means acting on energization of such power control relay to effect feed of A.C. power to the corresponding and predetermined utilizer, means for supplying to the control system from the D.C. source uninterrupted and interruptable D.C. circuits means for supplying uninterrupted D.C. to said step switch circuit, and means connecting the negative side of all selector and power control relays into the interruptable D.C. circuit.

5. In apparatus including a plurality of separably operable A.C. energized heaters and a primary source of A.C. power consisting of first and second positive A.C. lines and a negative A.C. line, a secondary source of A.C. power derived from the primary source and consisting of two positive lines and one negative line and arranged to supply A.C. power to each of said heaters, and a source of D.C. power derived from the negative and first positive lines of said primary source, a system for controlling feed of A.C. power to and temperature of a predetermined heater which system comprises a like plurality of D.C. actuated selection circuits each associated with said D.C. source and with a corresponding heater and each containing a D.C. actuated selector relay, a like plurality of D.C. actuated power control circuits each associated with a corresponding selection circuit and its corresponding heater and each containing a power control relay and a switch operable by energization of the corresponding selector relay and connected to control flow of D.C. to such power control relay, a D.C. actuated plural level step switch including a home position and a plurality of positioning contact points each associated with a corresponding selection circuit and its corresponding heater and means—operable on energization of the selector relay corresponding to the said predetermined heater and acting through a D.C. circuit electrically associated with the step switch and controlled by energization of such selector relay—for moving the step switch to a positioning contact point corresponding to such selector relay to effect closing of the corresponding power control circuit switch and energization of the corresponding power control relay, means acting on energization of such power control relay to effect feed of A.C. power to the corresponding and predetermined heater, means responsive to a predetermined maximum temperature in such predetermined heater to open the power control circuit corresponding to such predetermined heater and cut off feed of A.C. power thereto, means for supplying to the control system from the D.C. source uninterrupted and interruptable D.C. circuits, means for supplying uninterrupted D.C. to said step switch circuit, and means connecting the negative sides of all selector and power control relays into the interruptable D.C. circuit.

6. The apparatus of claim 5 further comprising means acting on A.C. power failure in said second positive line to break said interruptable D.C. circuit to cut off all A.C. feed to said predetermined heater.

7. The apparatus of claim 5 further comprising means acting on A.C. power failure in said second positive line to break said interruptable D.C. circuit to cut off all A.C. feed to said predetermined heater, and means including said uninterrupted D.C. circuit to thereafter effect return of the step switch to home position.

8. In apparatus including a plurality of separably operable A.C. energy utilizers and a source of A.C. power, a system for controlling feed of A.C. power to a predetermined utilizer which system comprises a like plurality of D.C. actuated selection circuits, each of which selection circuits is adapted to be fed with initial selector relay energizing D.C. and with relay lock-in D.C. and each of which is associated with a corresponding utilizer and each selection circuit containing a D.C. actuated selector relay, a like plurality of D.C. actuated power control circuits each associated with a corresponding selection circuit and its corresponding utilizer and each containing a power control relay operable by energization of the corresponding selector relay, a D.C. actuated plural level step switch including in one level an off-cycle home position and a plurality of positioning contact points each associated with a corresponding selection circuit and its corresponding utilizer, means—operable on energization of the selector relay corresponding to the said predetermined utilizer and acting through a D.C. circuit electrically associated with the step switch and controlled by energization of such selector relay—for moving the step switch to a positioning contact point corresponding to such selector relay to effect energization of the corresponding power control relay and feed of A.C. power to the corresponding and predetermined utilizer, and means acting on movement of the step switch off home position to cut off feed of initial energizing D.C. to all relays in all selection circuits.

9. In apparatus including a plurality of separably operable A.C. energy utilizers and a source of A.C. power, a system for controlling feed of A.C. power to a predetermined utilizer which system comprises a like plurality of D.C. actuated selection circuits each associated with a corresponding utilizer and each containing a D.C. actuated selector relay, a like plurality of D.C. actuated power control circuits each associated with a corresponding selection circuit and its corresponding utilizer and each containing a power control relay operable by energization of the corresponding selector relay, a D.C. actuated plural level step switch including in one level an off-cycle home position and a plurality of positioning contact points each associated with a corresponding selection circuit and its corresponding utilizer, means—operable on energization of the selector relay corresponding to the said predetermined utilizer and acting through an uninterrupted D.C. circuit electrically associated with the step switch and controlled by energization of such selector relay—for moving the step switch to a positioning contact point corresponding to such selector relay to effect energization of the corresponding power control relay and feed of A.C. power to the corresponding and predetermined utilizer, and means including the uninterrupted D.C. circuit associated with the step switch acting on de-energization of the selected selector relay to cut off feed of A.C. power to the predetermined utilizer and thereafter return the step switch to home position.

References Cited by the Examiner
UNITED STATES PATENTS

| | | | |
|---|---|---|---|
| 1,933,901 | 11/33 | Gannon | 317—139 |
| 2,568,700 | 9/51 | Armstrong | 219—485 |
| 2,634,376 | 4/53 | Eck | 317—139 |
| 2,895,088 | 7/59 | Koenig | 317—139 |
| 2,962,634 | 11/60 | Griffin | 317—139 |

RICHARD M. WOOD, *Primary Examiner.*

WALTER STOLWEIN, ANTHONEY BARTIS,
*Examiners.*

UNITED STATES PATENT OFFICE
CERTIFICATE OF CORRECTION

Patent No. 3,196,254                          July 20, 19

Alan R. Knoop

It is hereby certified that error appears in the above numbered patent requiring correction and that the said Letters Patent should read as corrected below.

Column 7, line 15, for "interrupted" read -- uninterrupte --; line 44, for "inclining" read -- including --; same column 7, line 52, after "with" insert -- a --.

Signed and sealed this 18th day of January 1966.

(SEAL)
Attest:

ERNEST W. SWIDER                         EDWARD J. BRENNER
Attesting Officer                           Commissioner of Patents